Jan. 13, 1970

R. A. SLOUKA 3,489,480

DENTAL CONSOLE WITH VERTICALLY-SLIDING
REMOVABLE FRONT PANEL ASSEMBLY

Filed March 4, 1968

INVENTOR.
Richard A. Slouka
BY
Dawson, Tilton, Fallon & Lungmus
Attys.

Jan. 13, 1970 R. A. SLOUKA 3,489,480
DENTAL CONSOLE WITH VERTICALLY-SLIDING
REMOVABLE FRONT PANEL ASSEMBLY
Filed March 4, 1968 2 Sheets-Sheet 2

INVENTOR:
Richard A. Slouka
BY
Dawson, Tilton, Fallon & Lungmus
Attys.

United States Patent Office 3,489,480
Patented Jan. 13, 1970

3,489,480
DENTAL CONSOLE WITH VERTICALLY-SLIDING
REMOVABLE FRONT PANEL ASSEMBLY
Richard A. Slouka, Carpentersville, Ill., assignor to American Hospital Supply Corporation, Evanston, Ill., a corporation of Illinois
Filed Mar. 4, 1968, Ser. No. 710,345
Int. Cl. A47b 51/00, 57/00; A61c 19/02
U.S. Cl. 312—319
6 Claims

ABSTRACT OF THE DISCLOSURE

A relatively thin, rectangular console provides an upper chamber for receiving a retractable cuspidor assembly. A front door panel is coupled to vertically-extending ball bearing slides for movement between an upper position for covering the cuspidor when it is retracted, and a lower position for uncovering the same. An intermediate panel is releasably locked to the console frame and bears the mating track members along which the rails of the vertically-movable door panel move. A constant tension spring mechanism is connected between the door panel and the intermediate panel for counterbalancing the weight of the door panel and resiliently biasing it upward. A latch mechanism is provided for releasably holding the door panel in its lower position. The door panel and intermediate panel are removable as a unit for servicing the console.

Background

The present invention relates to dental consoles; more particularly, it relates to a front panel assembly for a dental console wherein a door panel is vertically slidable for covering or uncovering an upper chamber in the console and yet capable of being completely removed from the console for servicing.

Prevailing design of dental consoles emphasizes compact design which is both pleasing and functional. Typically, a retractable cuspidor and cup-filler assembly is located at the top of the console. The cuspidor and cup-filler assembly is extended for use, and retracted into a chamber provided in the console for storage. It is desirable to have a door panel which covers the cuspidor chamber when the console is not in use and which does not impede frontal access to the console for servicing of the various control valves, etc. which are housed within the console. Problems arise in providing these features for a console design with predominantly flat surface panels which are flush at junctures.

Summary

A front door panel is slidably mounted by means of ball bearing slides on an intermediate panel which snaps into place at the front of the console. A constant tension spring mechanism is connected between the intermediate panel and the slidable front panel for counterbalancing the weight of the front panel as it is moved between its upper and lower positions, and for slightly biasing the door panel in an upward direction.

A flat extension bar is fastened to the top of the slidable front door panel and extends forwardly thereof for providing a handle for raising and lower the door. This flat bar also serves to extend the tray area of the cuspidor chamber since, in the lowered position of the front door, the horizontal bar is co-planar with the bottom surface of the cuspidor chamber. Thus, there is provided a front door panel assembly which is easily movable between an upper and a lower position, and which is counterbalanced relative to the console. Further, the entire front panel assembly is easily removed from the console for servicing the elements housed in the console.

Other features and advantages of the instant invention will be apparent to persons skilled in the art from the following detailed description of a preferred embodiment accompanied by the attached drawing wherein like reference numerals will refer to identical elements in the various views.

The drawing

Detailed description

Figure 1:
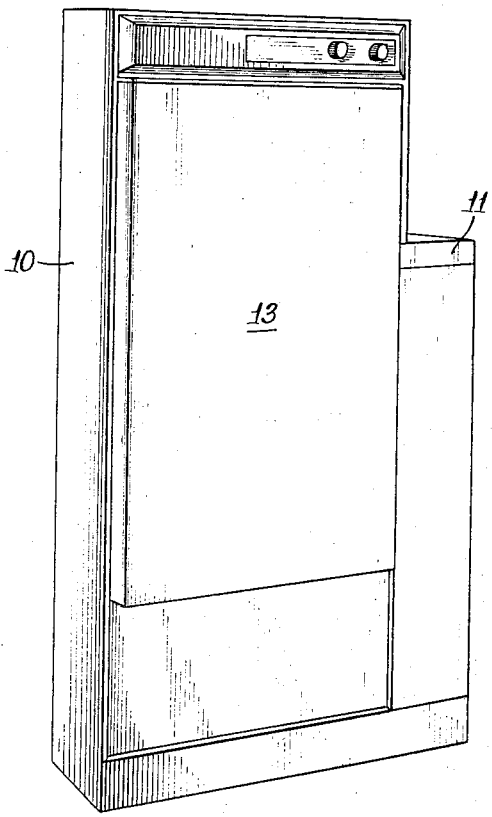
FIG. 1 is a perspective view of a dental console according to the present invention having its front door panel in an upper position.
Figure 2:
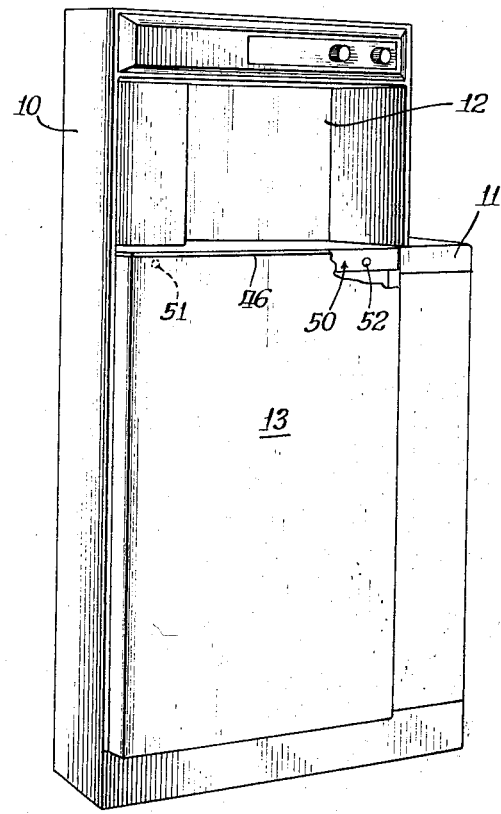
FIG. 2 shows the console of FIG. 1 with the front door panel lowered.
Figure 5:
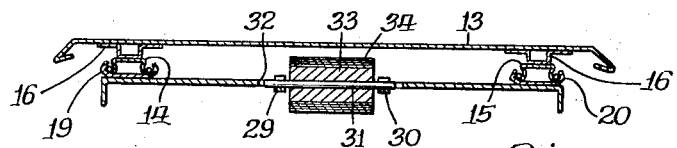
FIG. 5 is a horizontal cross section view of the front panel assembly taken through the line 5—5 of FIG. 4.
Figure 6:
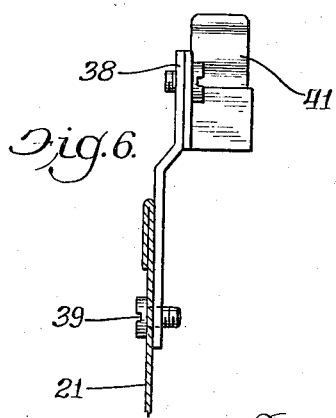
FIG. 6 is a detailed cross section view of the latching mechanism for holding the sliding panel in a lowered position.

Referring to FIGS. 1 and 2, a dental console according to the present invention has a cabinet which is generally designated by reference numeral 10. The cabinet 10 is seen to have a generally rectangular shape with a flat, unadorned design. As is desirable from the standpoint of conserving available space, the cabinet 10 is relatively thin. Hence, when the cabinet 10 is placed against a wall, it does not project substantially from the wall and therefore efficiently utilizes available space.

To the right of the cabinet 10, as viewed in FIGS. 1 and 2, there is located a housing 11 which contains a verticlly-extended shaft on which is mounted a mobile arm and tray assembly which is not shown since it forms no part of the instant invention. The top of the console 10 defines a chamber generally designated 12 in FIG. 2, which is adapted to receive a cuspidor and cup-filler assembly which also is not shown. The cuspidor and cup-filler assembly rotates within its chamber between an extended position, at which the elements thereof are more readily accessible, and a retracted position wherein it is completely enclosed within the chamhber 12.

According to the present invention, a front door panel 13, which is sometimes herein referred to as an accent panel, is vertically slidable between an upper position (FIG. 1) in which the accent panel completely covers the cuspidor chamber 12 and thus hides the contents thereof, and a lower position (FIG. 2) in which the cuspidor and cup-filler assembly may be extended for use. The capability of hiding the cuspidor and cup-filler assembly is desirable not only from the standpoint of dust-free storage, but also to prevent operating distractions.

Figure 3:
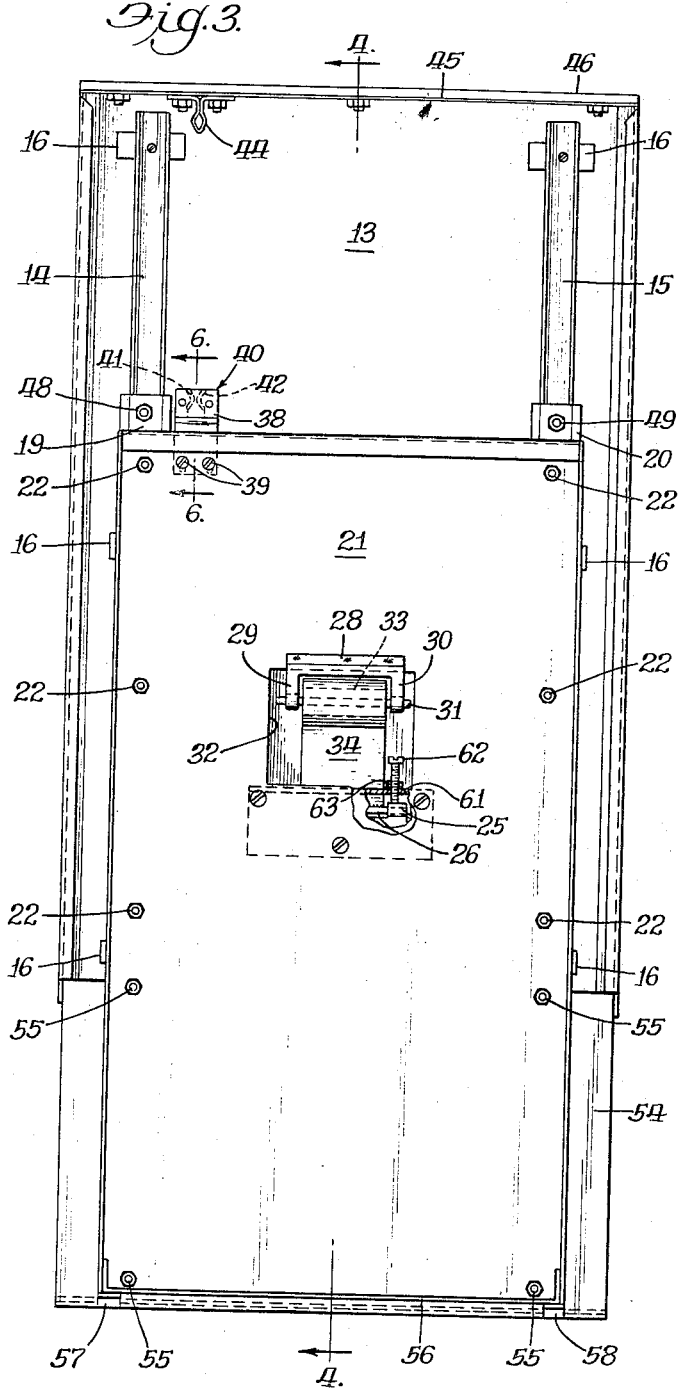
FIG. 3 is a rear elevation view of the removable front panel assembly of the console of FIG. 1.
Figure 4:
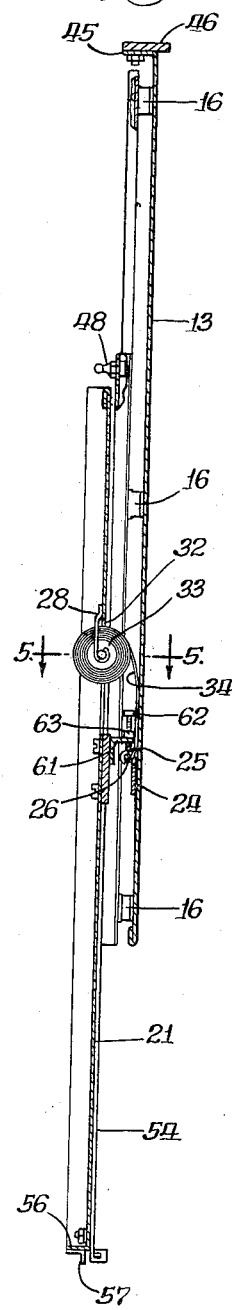
FIG. 4 is a vertical cross section view of the front panel assembly of FIG. 3 taken through the line 4—4.

Turning to FIGS. 3 and 4, first and second rail members 14 and 15 are vertically mounted on either side of the rear surface of the accent panel 13 and spaced therefrom by means of spacers 16. The rails 14 and 15 are slidably received within track members 19 and 20 which are also vertically oriented and secured to an intermediate panel 21 with nut and bolt assemblies 22. The rail 14 and its associated track 19 as well as the rail 15 and its associated track 20 comprise conventional ball bearing slides so that the accent panel is slidable vertically to the intermediate panel 21. The front door panel and the intermediate panel are sometimes referred to as the front panel assembly; and as will be made clear presently, this entire assembly is removable from the cabinet as a unit.

On the inside of the accent panel 13 is mounted a plate 24 which defines two inverted-U-shaped flanges (identified respectively as 25 in FIG. 4 and 26 in FIG. 3) which provide a trunnion seating for a shaft 26.

A mounting plate 28, similar to the mounting plate 24, is attached to the intermediate panel 21; and it provides first and second side extensions 29 and 30, each defining a U-shaped seat for receiving a shaft 31. The plate 28 extends from the upper boundary of a rectangular aperture 32 in the intermediate panel 21; and a cylinder 33 having a flat steel spring tightly coiled about it is rotatably mounted on the shaft 31. A free end of the spring 34 is welded to the shaft 26 which is seated within the inverted-U-shaped members 25 and 26 of the plate 24 on the accent panel. The force exerted by the spring 34 tending to assume a coil shape is substantially constant independent of the position of the door panel; and this upward tension force is counterbalanced by the weight of the front door panel 13 and the rails 14 and 15.

It will be observed from FIG. 4, that as the spring 34 is uncoiled, it is constrained against a tendency to expand forward (i.e. to the right as viewed in FIG. 4) by abutting the interior surface of the accent panel 13. Preferably, the tension exerted by the spring 34 is such that the constant force is slightly greater than the weight of the accent panel 13 and its associated rails 14 and 15. The reason for this is that it is desirable to have the accent panel 13 resiliently biased upwardly and held in its upper position rather than in its lower position. A latch assembly, to be presently explained, is provided for releasably locking the accent panel in its lower position.

As seen in FIG. 3, a mounting plate 38 is secured to the front surface of the intermediate panel 21 by means of screws 39. Mounted on the front surface of the mounting plate 38 is a latch-type receptacle, generally designated 40 and having first and second V-shaped side members 41 and 42 resiliently mounted in opposing relation relative to one another. A diamond-shaped knob 44 is mounted through a top rearwardly-extending flange 45 of the accent panel 13 and located directly above the latch receptacle 40 so that when the front door panel 13 is lowered, the knob-shaped member 41 will be seated in the latch receptacle 40 and the accent panel 13 will be releasably secured in its lower position.

A flat extension bar 46 is mounted to the top surface of the rearward-extending top flange 45 of the accent panel 13. When the accent panel is secured in its lowered position, as seen in FIG. 2, the top surface of the bar 46 is co-planar with the lower surface of the cuspidor chamber 12 so that the bar 46 serves a dual purpose of providing a handle for the accent panel 13 while maintaining the overall functional design aspect of the console; and it also provides an extension of the lower surface of the chamber 12.

Mounted respectively to, and extending rearward of, the track members 19 and 20 are studs 48 and 49, each defining at its rearward portion a spherical nib. An extension of the frame of the console, generally designated 50 in FIG. 2 and extending horizontally across the front of the console just beneath the chamber 12 provides first and second seats 51 and 52 for releasably receiving respectively the spherical portions of the studs 49 and 48 in snapping engagement.

A false sub-panel 54 is attached to the front surface at the bottom of the intermediate panel 21 by means of nut and bolt assemblies generally designated 55. The false panel 54 extends laterally beyond the intermediate panel 21 for providing a flush surface with the sides of the cabinet 10. Secured to a rearwardly-extending bottom flange 56 of the intermediate panel 21 are first and second feet members 57 and 58, each defining a downwardly-projecting toe portion which fits in a receiving slot in the frame of the cabinet.

As angle iron 61 (FIG. 4) is mounted to the intermediate panel 21 across the aperture 32 with one side 61 extending forwardly thereof and threadably receiving a bolt 62. A nut 63 locks the bolt 62 to the iron 61. The bolt 62 is located to engage the seat portion 26 of the plate 24 attached to the accent panel and thereby provide an adjustable stop for upward movement of the accent panel which, as already mentioned, is slightly biased in an upward direction.

The entire front panel assembly including the accent panel 13, the intermediate panel 41, and the false panel 54 together with the slides and the constant tension mechanism is removable by moving the accent panel 13 slightly above the lower surface of the chamber 12 to provide a pulling surface; and then the entire front panel is simply rotated about a horizontal axis defined by the lower feet members 57 and 58 until the spherical nibs 48 and 49 are released from their associated sockets in the frame extension 50. The assembly is then lifted slightly until the feet 57 and 58 disengage the cabinet. Thus, the entire front panel assembly which is readily removed from the console for servicing; and it includes a vertically-slidable accent panel for covering the cuspidor chamber of the console. At the same time, the weight of the accent panel 13 is counterbalanced with a slight excess so that it is resiliently held in its uppermost position; and a latching mechanism is provided for securing the accent panel to the intermediate panel in its lower position. All of this is accomplishred while maintainng the overall design concept of a relatively thin, rectangular dental console which is both functional and pleasing to the eye.

It will be obvious to persons skilled in the art that certain of the structural details hereinbefore described may be modified or equivalent structure substituted therefor without departing from the inventive principle; and it is therefore, intended that all modifications and equivalents be covered as they are embraced within the spirit and scope of the invention.

I claim:
1. A dental console comprising: a generally rectangular cabinet providing an upper chamber; a front panel assembly including a door panel, an intermediate panel, means for mounting said door panel for vertically sliding relative to said intermediate panel whereby said door panel is movable between an upper position covering said chamber and a lower position exposing said chamber, and force producing means interconnecting said intermediate panel and said door panel for counterbalancing the weight of said door panel in moving the same; and means for releasably interconnecting said intermediate panel with said cabinet.

2. The console of claim 1 wherein said means for slidably connecting said door panel to said intermediate panel further comprises: first and second track means vertically mounted at the sides of said intermediate panel; and first and second rail members vertically slidably received within said first and second track members respectively and mounted to the rear surface of said door panel.

3. The console of claim 2 wherein constant tension means biases said door panel in an upward direction, said console further comprising latching mechanism for latching said door panel to said intermediate panel in said lower position.

4. The console of claim 3 wherein said constant tension means includes a cylinder rotatably mounted on said intermediate panel for rotation about a horizontal axis, a flat steel spring coiled about said cylinder and attached to said door panel, the flat of said spring engaging said door panel as said door panel is lowered.

5. The structure of claim 4 further comprising adjustable means for limiting the upward travel of said door panel relative to said intermediate panel.

6. The console of clim 5 further comprising feet members secured to the bottom of said intermediate panel adapted for placement in receiving apertures of said cabinet; and first and second spherical nibs projecting rearwardly of said intermediate panel; and a frame extension in said console defining first and second sockets for receiving said nibs, whereby the entire panel assembly may be removed by releasing said nibs from their associated sockets and rotating the panel assembly about a horizontal axis until said feet members are free from their associated apertures.

References Cited

UNITED STATES PATENTS

| | | | |
|---|---|---|---|
| 2,202,358 | 5/1940 | Stone | 312—297 |
| 2,737,781 | 3/1956 | Gelfand et al. | 312—312 |
| 3,143,803 | 8/1964 | Lunn | 312—312 X |
| 3,404,458 | 10/1968 | Weiss et al. | 32—22 |

JAMES T. McCALL, Primary Examiner

U.S. Cl. X.R.

32—22; 312—312